US012326528B2

(12) United States Patent
Sättele

(10) Patent No.: US 12,326,528 B2
(45) Date of Patent: Jun. 10, 2025

(54) ULTRASONIC SENSOR SYSTEM, METHOD FOR OPERATING ULTRASONIC SENSORS AND MOTOR VEHICLE

(71) Applicant: Conti Temic microelectronic GmbH, Nuremberg (DE)

(72) Inventor: Peter Sättele, Biberach (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 217 days.

(21) Appl. No.: 17/753,310

(22) PCT Filed: Aug. 3, 2020

(86) PCT No.: PCT/DE2020/200063
§ 371 (c)(1),
(2) Date: Feb. 27, 2022

(87) PCT Pub. No.: WO2021/037316
PCT Pub. Date: Mar. 4, 2021

(65) Prior Publication Data
US 2022/0299616 A1    Sep. 22, 2022

(30) Foreign Application Priority Data
Aug. 27, 2019    (DE) .................... 10 2019 212 837.8

(51) Int. Cl.
*G01S 7/53* (2006.01)
*G01S 7/527* (2006.01)
(Continued)

(52) U.S. Cl.
CPC .............. *G01S 7/53* (2013.01); *G01S 7/5273* (2013.01); *G01S 15/102* (2013.01);
(Continued)

(58) Field of Classification Search
CPC ........ G01S 7/53; G01S 7/5273; G01S 15/102; G01S 15/878; G01S 15/931; G01S 2015/932
See application file for complete search history.

(56) References Cited

U.S. PATENT DOCUMENTS

2013/0142011 A1* 6/2013 Hallek ................... G01S 7/527
367/87
2014/0198620 A1   7/2014 Prausse

FOREIGN PATENT DOCUMENTS

| CN | 103534603 A | 1/2014 |
| CN | 103703388 A | 4/2014 |

(Continued)

OTHER PUBLICATIONS

Notice of Reasons for Refusal dated Oct. 17, 2022 for the counterpart Japanese Patent Application No. 2022-505333.
(Continued)

*Primary Examiner* — Isam A Alsomiri
*Assistant Examiner* — Abdallah Abulaban

(57) ABSTRACT

The invention relates to a method for operating ultrasonic sensors) for a motor vehicle, including emitting a plurality of ultrasonic signals by respective ultrasonic sensors. The ultrasonic signals include a sequence of elementary signals. The elementary signals have signal pauses and a plurality of different signal pulses. The ultrasonic signals differ from one another by the sequence of the elementary signals. The method further includes receiving reflected ultrasonic signals, wherein the received ultrasonic signals are associated with the emitted ultrasonic signals on the basis of the sequences of the elementary signals.

19 Claims, 2 Drawing Sheets

(51) Int. Cl.
*G01S 15/10* (2006.01)
*G01S 15/87* (2006.01)
*G01S 15/931* (2020.01)

(52) U.S. Cl.
CPC .......... *G01S 15/878* (2013.01); *G01S 15/931* (2013.01); *G01S 2015/932* (2013.01)

(56) References Cited

FOREIGN PATENT DOCUMENTS

| | | | | |
|---|---|---|---|---|
| CN | 103782186 | A | 5/2014 | |
| CN | 105324651 | A | 2/2016 | |
| CN | 106448187 | A | 2/2017 | |
| DE | 102005026386 | A1 | 12/2006 | |
| DE | 102009031955 | A1 | 12/2010 | |
| DE | 102014110187 | A1 * | 1/2016 | ........... G01S 15/104 |
| DE | 102016222810 | A1 | 5/2018 | |
| EP | 3324207 | A1 * | 5/2018 | |
| EP | 2791699 | B1 | 3/2019 | |
| JP | 2013538344 | A | 10/2013 | |
| WO | 2014097479 | A1 | 6/2014 | |

OTHER PUBLICATIONS

German Search Report dated Feb. 7, 2020 for the counterpart German Patent Application No. 10 2019 212 837.8.
The International Search Report and the Written Opinion of the International Searching Authority mailed on Nov. 30, 2020 for the counterpart PCT Application No. PCT/DE2020/200063.
Chinese First Office Action dated Feb. 28, 2025 for the counterpart Chinese Patent Application No. 202080058724.5 and machine translation of same.
European Examination Report dated Apr. 11, 2025 for counterpart European Patent Application No. 20767967.1 and machine translation of same.

* cited by examiner

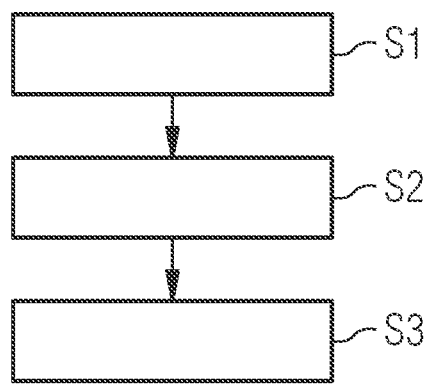
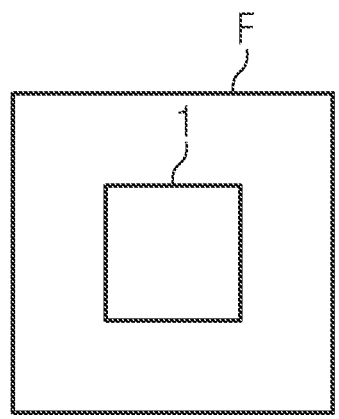

ULTRASONIC SENSOR SYSTEM, METHOD FOR OPERATING ULTRASONIC SENSORS AND MOTOR VEHICLE

CROSS REFERENCE TO RELATED APPLICATIONS

This application claims priority to PCT Application PCT/DE2020/200063, filed Aug. 3, 2020, which claims priority to German Application DE 10 2019 212 837.8, filed Aug. 27, 2019. The disclosures of the above applications are incorporated herein by reference.

FIELD OF INVENTION

The invention relates to an ultrasonic sensor system for a motor vehicle, and a method for operating ultrasonic sensors for a motor vehicle and a motor vehicle.

BACKGROUND

Ultrasonic sensors have a transmitting device which emits ultrasonic signals which propagate in air at the speed of sound of roughly 340 meters per second. The ultrasonic signal is reflected by objects in the surroundings and is detected by a receiver device of the ultrasonic sensor. The distance from the object can be determined on the basis of the transit time difference between the time of transmission and the time of receipt, taking account of the propagation velocity of the ultrasonic signal.

Ultrasonic sensors are deployed for motor vehicles for capturing the environment in the vicinity up to, for instance, 7 meters. Ultrasonic sensors are particularly important in parking applications, for instance measuring the parking distance, searching for parking spaces or during automated parking. The typical distances and speeds during parking operations require a minimum distance which is as small as possible, in the range of a few centimeters, the highest possible scanning rate and the lowest possible vulnerability to spurious signals which include ultrasonic signals from ego systems or external systems as well as uncorrelated sources. The available frequency range which is compatible with these requirements is between 45 kHz and 55 kHz, for instance.

It is not possible to receive signals while the ultrasonic signal is being emitted, so that backscatters from objects within a "blind zone" in the immediate vicinity of the ultrasonic sensor cannot be recognized. The resulting minimum measuring distance is influenced by the pulse duration of the transmit signal which, as a consequence, has to be as short as possible.

A plurality of ultrasonic sensors is typically installed in motor vehicles. In order to evaluate the ultrasonic signals, for instance in order to localize the objects by means of trilateration, it is essential that the received reflected ultrasonic signals are clearly associated with the respective ultrasonic sensors which have emitted the ultrasonic signals. One possibility is that the individual sensors emit ultrasonic signals at a sufficiently large temporal distance so that there is a high probability that the respective echoes have died away, taking account of the maximum range, before the next sensor emits an ultrasonic signal. A minimum temporal distance of two consecutive ultrasonic signals of, for instance, 50 ms is produced for a measuring distance of, for instance, 5 meters, taking account of a certain protection time, so that times of 250 ms and more for scanning a vehicle side are produced for a plurality of ultrasonic sensors, which leads in particular to restrictions regarding the speed of the parking space search and the driving maneuvers for the automated parking.

SUMMARY

It is therefore an object of the present disclosure to simplify an association of the reflected ultrasonic signals with the emitted ultrasonic signals.

This object is achieved by a method for operating ultrasonic sensors for a motor vehicle having the features of claim 1, an ultrasonic sensor system for a motor vehicle having the features of claim 8, and a motor vehicle having the features of claim 15.

Further preferred embodiments are the subject-matter of the subclaims.

According to a first aspect, the present disclosure thus creates a method for operating ultrasonic sensors for a motor vehicle, wherein a plurality of ultrasonic signals is emitted by respective ultrasonic sensors. The ultrasonic signals consist of a sequence of elementary signals. The elementary signals have signal pauses and a plurality of different signal pulses. The ultrasonic signals differ from one another by the sequence of the elementary signals. Reflected ultrasonic signals are received. The received reflected ultrasonic signals are associated with the emitted ultrasonic signals on the basis of the sequences of the elementary signals.

According to a second aspect, the present disclosure thus provides an ultrasonic sensor system for a motor vehicle, comprising a transmitting device, a receiver device and an evaluation device. The transmitting device is configured to emit a plurality of ultrasonic signals. The ultrasonic signals consist of a sequence of elementary signals. The elementary signals have signal pauses and a plurality of different signal pulses. The ultrasonic signals differ from one another by the sequence of the elementary signals. The receiver device receives the reflected ultrasonic signals. The evaluation device associates the received reflected ultrasonic signals with the emitted ultrasonic signals on the basis of the sequences of the elementary signals.

According to a third aspect, the invention relates to a motor vehicle having at least one ultrasonic sensor system according to the invention.

One idea which forms the basis of the present disclosure consists of providing ultrasonic signals which can be distinguished from one another on the basis of the sequence of elementary signals typical of the respective ultrasonic signal. To this end, the present disclosure is based on a pulse-pause coding method which has a plurality of different signal pulses, i.e., at least two signal pulses. In order to use the ultrasonic signals, at least three different elementary signals are thus used, namely signal pauses as well as at least two different signal pulses. This creates an at least three-valued set of elementary signals so that code sequences can be produced, which are distinguished with respect to the use of two-valued sequences at the same length by a higher signal energy and a larger code distance, i.e., a smaller cross-correlation energy. The signal space used to generate the ultrasonic signals is consequently extended by at least one dimension with respect to the use of two-valued sequences.

According to a preferred further development of the method for operating ultrasonic sensors, the elementary signals are orthogonal with respect to one another. Orthogonal elementary signals can be understood to be those signals, the correlation functions of which meet certain auxiliary conditions. In particular, it can be required that the autocorrelation function comprises a significantly pronounced main peak and only minor ancillary peaks. It can further be required that the cross-correlations are as small as possible, i.e., smaller than predefined thresholds. The orthogonality of the elementary signals can also be determined on the basis of the correlation factor which describes the similarity of two signals. If the correlation factor disappears, the signals are orthogonal. The orthogonality allows a simpler separation of the elementary signals so that the reflected ultrasonic signal can be associated more simply with the emitted ultrasonic signal or the corresponding ultrasonic sensor.

According to a further development of the method for operating ultrasonic sensors, the signal pulses of the plurality of signal pulses differ from one another by their modulation.

According to a further development of the method for operating ultrasonic sensors, the signal pulses of the plurality of signal pulses have positive chirps (or chirp-up signals) and negative chirps (or chirp-down signals). For example, a frequency of the signal pulse can be changed from a lower limit to an upper limit within a predefined number of oscillations, for instance within eight oscillations. The lower limit can lie in a range between 45 kHz and 48 kHz, for example. The lower limit preferably has a value of 48 kHz. The upper limit can lie in a range between 51 kHz and 55 kHz, for example. The upper limit preferably has a value of 51 kHz. By using corresponding filters, signal pulses having an increasing frequency, i.e., positive chirps, can be distinguished from signal pulses having decreasing frequency, i.e., negative chirps. Positive chirps and negative chirps can consequently be considered as substantially orthogonal elementary signals. Three elementary signals are thus made available as a result of using pauses, positive chirps and negative chirps.

According to a further development of the method for operating ultrasonic sensors, the signal pulses of the plurality of signal pulses have Barker codes or Gold codes. Gold codes are binary sequences with low cross-correlations. A Barker code is a binary code having minimal autocorrelation. In particular, the elementary signals can have Barker codes with a length of 2, i.e., +1 −1 and +1 +1. The elementary signals can also have Barker codes with a length of 4, i.e., +1 −1 +1 +1 and +1 −1 −1 −1. The states +1 and −1 can be represented for example by different frequencies. For example, one of the states +1 and −1 can correspond to a frequency of 49 kHz and a second state can correspond to a frequency of 41 kHz. The states +1 and −1 can further be realized by phase shifts of a transmit signal within a predefined number of oscillations. It can further be provided that the states +1 and −1 are realized by shifting a transmit signal, i.e., displacements by 90 degrees or 180 degrees.

According to a further development of the method for operating ultrasonic sensors, the association of the received ultrasonic signals with the emitted ultrasonic signals has a filtering of the received ultrasonic signals by means of correlation filters or optimal filters. The correlation filters allow a distinction to be made between different signal pulses, for instance between positive and negative chirps or between various Barker codes or Gold codes.

According to a further development of the method for operating ultrasonic sensors, the association of the received ultrasonic signals with the emitted ultrasonic signals has a filtering of the received ultrasonic signals by means of transversal filters. It is possible to distinguish between signal pauses and signal pulses on the basis of the transversal filters.

According to a further development of the method for operating ultrasonic sensors, both correlation filters and transversal filters can be used during the association of the received ultrasonic signals with the emitted ultrasonic signals. The ultrasonic signals have sequences of elementary signals that can be correlated, that means correlation sequences, having signal pauses and signal pulses. The transversal filters allow a distinction to be made between signal pauses and signal pulses, while the correlation filters distinguish various signal pulses from one another. Since the correlation sequences can be clearly associated with an ultrasonic sensor, the received ultrasonic signal can accordingly also be clearly associated with an emitted ultrasonic signal or a corresponding ultrasonic sensor.

According to a further development of the method for operating ultrasonic sensors, the association of the received ultrasonic signals with the emitted ultrasonic signals has an evaluation of the received ultrasonic signals by means of maximum likelihood sequence estimation.

According to a further development of the ultrasonic sensor system, the elementary signals are orthogonal with respect to one another.

According to a further development of the ultrasonic sensor system, the signal pulses of the plurality of signal pulses differ from one another by their modulation.

According to a further development of the ultrasonic sensor system, the signal pulses of the plurality of signal pulses have positive chirps and negative chirps.

According to a further development of the ultrasonic sensor system, the signal pulses of the plurality of signal pulses have Barker codes or Gold codes.

According to a further development of the ultrasonic sensor system, the evaluation device is configured to filter the received ultrasonic signals by means of correlation filters in order to associate the received ultrasonic signals with the emitted ultrasonic signals.

According to a further development of the ultrasonic sensor system, the evaluation device is configured to filter the received ultrasonic signals by means of transversal filters in order to associate the received ultrasonic signals with the emitted ultrasonic signals. In particular, both correlation filters and transversal filters can be used during the association of the received ultrasonic signals with the emitted ultrasonic signals.

According to a further development of the ultrasonic sensor system, the evaluation device is configured to evaluate the received ultrasonic signals by means of maximum likelihood sequence estimation in order to associate the received ultrasonic signals with the emitted ultrasonic signals.

BRIEF DESCRIPTION OF THE DRAWINGS

The present invention is explained in greater detail below on the basis of the exemplary embodiments indicated in the schematic figures of the drawings, wherein:

FIG. 3 shows a flow chart of a method for operating ultrasonic sensors for a motor vehicle according to an example embodiment; and FIG. 4 shows a schematic block diagram of a motor vehicle according to an example embodiment.

DETAILED DESCRIPTION

Where appropriate, the described configurations and further developments can be combined with one another as desired. Further possible configurations, further developments and implementations of the example embodiments also have combinations, which are not explicitly indicated, of features which are described previously or below regarding the example embodiments.

The appended drawings are intended to convey a further understanding of the example embodiments. They illustrate embodiments and, in connection with the description, serve to explain principles and concepts of the invention. Other embodiments and many of the indicated advantages are set out with respect to the drawings.

Figure 1:
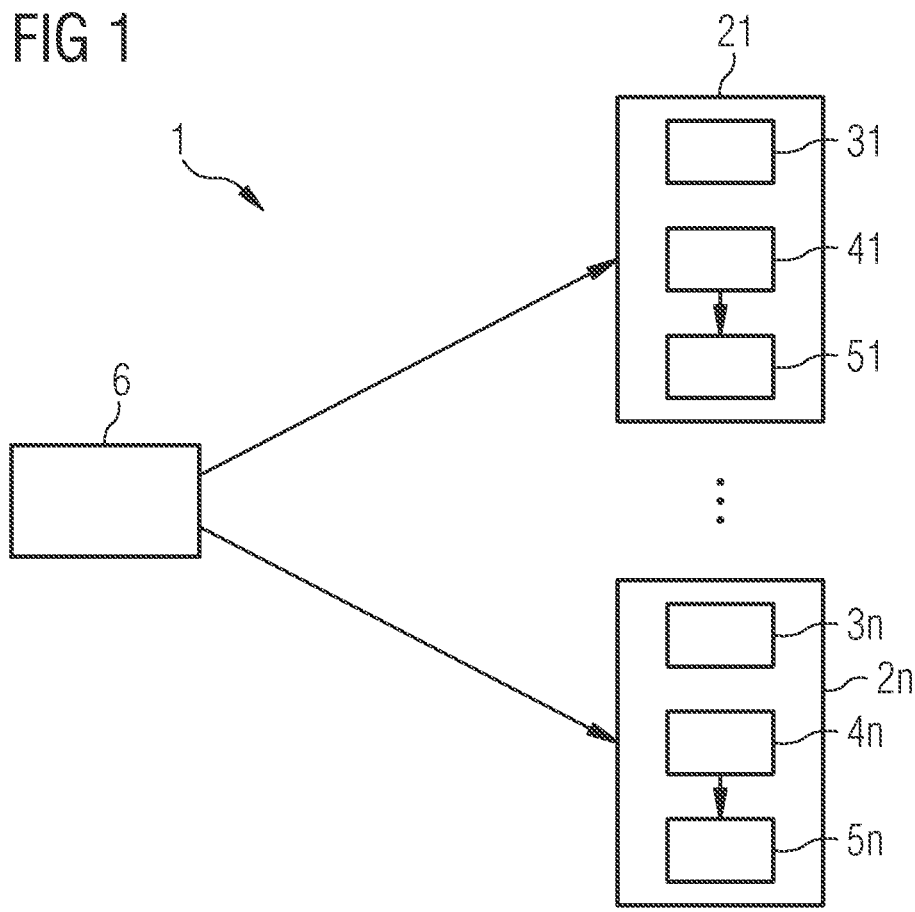
FIG. 1 shows a schematic block diagram of an ultrasonic sensor system according to an example embodiment.

FIG. 1 shows a schematic block diagram of an ultrasonic sensor system 1.

The ultrasonic sensor system 1 has a plurality of ultrasonic sensors 21 to 2n which in each case comprise a transmitting device 31 to 3n, a receiver device 41 to 4n and an evaluation device 51 to 5n.

The transmitting devices 31 to 3n and the receiver devices 41 to 4n of the ultrasonic sensor 21 to 2n can comprise piezo ceramics as transducers, i.e., can be configured as active transmitting or receiving converter elements. These operate as resonant oscillator elements, which necessitates a high efficiency. The transmitting devices 31 to 3n emit respective ultrasonic signals. Each ultrasonic signal is built up from elementary signals which have signal pauses and at least two different signal pulses. Various signal pulses can differ from one another, for example, by their modulation. For example, two different signal pulses can be provided, namely positive chirps and negative chirps. In this case, three elementary signals are consequently available, namely signal pauses, positive and negative chirps, in order to generate the ultrasonic signals. Compared to methods having merely two elementary signals, for instance signal pulses and signal pauses or positive and negative chirps, this makes more possibilities available to build up ultrasonic signals which are different from one another.

The receiver devices 41 to 4n receive the ultrasonic signals which have been reflected by objects in the surroundings of the ultrasonic sensors 21 to 2n.

The evaluation devices 51 to 5n analyze the ultrasonic signals received by the corresponding receiver device 41 to 4n of the ultrasonic sensors 21 to 2n in order to associate the ultrasonic signals with the respective ultrasonic sensors 21 to 2n. In particular, the evaluation device 51 to 5n of a respective ultrasonic sensor 21 to 2n can be configured to extract the ultrasonic signal which has been emitted by the corresponding transmitting device 31 to 3n of the ultrasonic sensor 21 to 2n.

According to further embodiments, it can also be provided that the ultrasonic sensor system 1 only comprises a single evaluation device which evaluates the ultrasonic signals received by the receiver devices 41 to 4n. These can associate all of the received ultrasonic signals with the respective emitted ultrasonic signals or, as a result, with the respective ultrasonic sensors 21 to 2n.

The ultrasonic sensor system 1 further has a control device 6 which controls the ultrasonic sensors 21 to 2n. The control device 6 is configured to actuate the transmitting devices 31 to 3n in such a way that a sequence of elementary signals used for a certain ultrasonic signal is not used again for a further ultrasonic signal from another ultrasonic sensor 21 to 2n at least within a predefined time window. The time window is selected in such a way that, taking account of the maximum range, there is a high probability that corresponding echoes have died away. A time window of 50 ms can be selected for a measuring distance of 5 meters, for example taking account of a corresponding protection time, i.e., of a safety buffer. Generally, the time window can be at least 20 ms, at least 50 ms or at least 100 ms, for example.

The analysis of the received ultrasonic signals for an exemplary evaluation device 51 to 5n of an ultrasonic sensor 21 to 2n is described more accurately below. It is understood that the analysis is effected similarly in the event that the ultrasonic sensor system 1 only comprises a single evaluation device.

The evaluation device 51 to 5n has software and/or hardware components, for instance CPUs (central processing units), GPUs (graphics processing units), microcontrollers, integrated circuits, ASICs (application-specific integrated circuits), FPGAs (field programmable gate arrays) or the like. The evaluation device 51 to 5n can further comprise volatile or non-volatile memories in order to save received ultrasonic signals, analysis results or data required for the analysis.

The evaluation device 51 to 5n can have multiple filters in order to filter the received ultrasonic signals. The evaluation device 51 to 5n can distinguish signal pauses and signal pulses by means of transversal filters. The evaluation device 51 to 5n can distinguish various signal pulses from one another by means of correlation filters. The evaluation device 51 to 5n can initially filter by means of transversal filters and subsequently by means of correlation filters or vice versa.

The evaluation device 51 to 5n reconstructs the sequence of the elementary signals of the received ultrasonic signals by analyzing the ultrasonic signals. The evaluation device 51 to 5n recognizes which ultrasonic sensor 21-2n has emitted the ultrasonic signal on the basis of a predetermined association of the sequences of the elementary signals with the individual ultrasonic sensors 21 to 2n.

Since the correlation sequences can be clearly associated with an ultrasonic sensor 12 to 2n, the received ultrasonic signal can accordingly also be clearly associated with an emitted ultrasonic signal or a corresponding ultrasonic sensor 21 to 2n.

Figure 2:
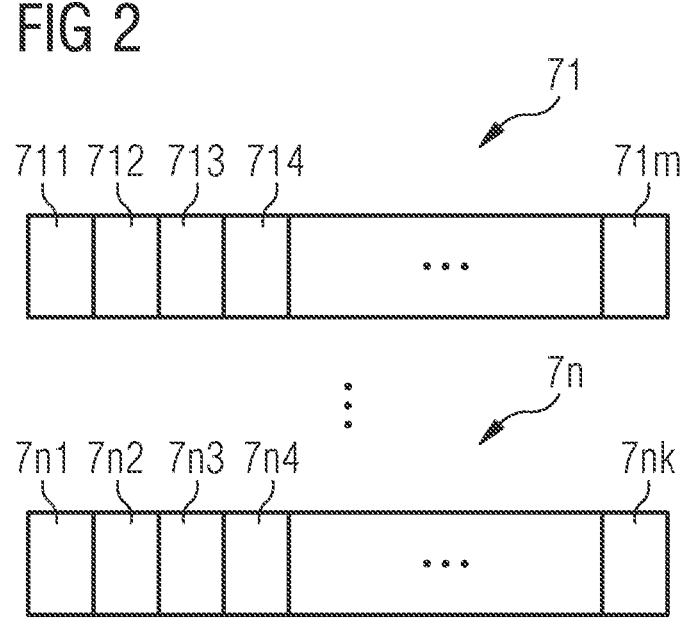
FIG. 2 shows a schematic representation of ultrasonic signals of various ultrasonic sensors according to an example embodiment.

FIG. 2 shows a schematic representation of ultrasonic signals 71 to 7n of various ultrasonic sensors 21 to 2n. Each ultrasonic signal 71 to 7n consists of a sequence of elementary signals 711-71m to 7n1-7nk, wherein the number m, k of the elementary signals 711-71m to 7n1-7nk can be the same for each ultrasonic signal 71 to 7n, but can also differ according to further embodiments. The various ultrasonic signals 71 to 7n differ in the sequence of the elementary signals 711-71m to 7n1-7nk.

FIG. 3 shows a flow chart of a method for operating ultrasonic sensors for a motor vehicle. The method can in particular be performed by means of an ultrasonic sensor system 1 as described above.

In a first method step S1, multiple ultrasonic signals 71 to 7n are emitted by respective ultrasonic sensors 21 to 2n. The ultrasonic signals 71 to 7n can be emitted successively in time or can also be emitted at least partially overlapping in time. In particular, the ultrasonic signals 71 to 7n can be emitted at the same time. The ultrasonic signals 71 to 7n are generated in such a manner that they differ from one another by the sequence of elementary signals. The elementary signals, from which the ultrasonic signals 71 to 7n are built up, have signal pauses and at least two different types of signal pulses. The signal pulses can differ from one another by their modulation, for example. Signal pulses can for example have positive chirps and negative chirps. The signal pulses can also have Barker codes or Gold codes.

In a second method step S2, the ultrasonic signals 71 to 7n reflected by objects are received. The received ultrasonic signals are analyzed in order to reconstruct the sequences of the elementary signals. The received ultrasonic signals 71 to 7n are associated with the emitted ultrasonic signals on the basis of the sequences of the elementary signals. In order to analyze the ultrasonic signals, filters can be used, in particular correlation filters and/or transversal filters. The association of the received ultrasonic signals with the emitted ultrasonic signals can have an evaluation by means of maximum likelihood sequence estimation.

In a further method step S3, the analyzed ultrasonic signals can be further evaluated in order to locate objects in the environment of the motor vehicle F, for example by means of trilateration, i.e., localization of targets by forming an intersection.

FIG. 4 shows a schematic block diagram of a motor vehicle according to an embodiment of the invention. The motor vehicle F has an ultrasonic sensor system 1 as described above having a plurality of ultrasonic sensors 21 to 2n. The motor vehicle F can have eight to twelve ultrasonic sensors 21 to 2n, for example. However, the invention is not restricted to such a number. Thus, fewer than eight or more than twelve ultrasonic sensors 21 to 2n can also be arranged on the motor vehicle F. The motor vehicle F can further have an evaluation apparatus for evaluating the ultrasonic signals, for instance by means of trilateration.

LIST OF REFERENCE NUMERALS

1 Ultrasonic sensor system
21 to 2n Ultrasonic sensors
31 to 3n Transmitting devices
41 to 4n Receiver devices
51 to 5n Evaluation devices
6 Control device
71-7n Ultrasonic signals
711-71m Elementary signals
7n1-7nk Elementary signals

The invention claimed is:

1. A method for operating ultrasonic sensors for a motor vehicle, comprising:
emitting a plurality of ultrasonic signals by respective ultrasonic sensors, wherein the ultrasonic signals each comprises a sequence of elementary signals, wherein the elementary signals have signal pauses and a plurality of different signal pulses, and wherein the ultrasonic signals differ from one another by the sequence of the elementary signals; and
receiving, by at least one of the ultrasonics sensors, reflected ultrasonic signals, wherein the received ultrasonic signals are associated with the emitted ultrasonic signals on the basis of the sequences of the elementary signals,
wherein the elementary signals comprise a first signal elementary signal, a second signal pulse elementary signal, and a pause elementary signal in which no signal is emitted, and associating the received ultrasonic signals includes associating a first received ultrasonic signal of the received ultrasonic signals with a first emitted ultrasonic signal of the plurality of emitted ultrasonic signals based upon a location of the pause elementary signal in the sequence of the elementary signals forming the first emitted ultrasonic signal.

2. The method according to claim 1, wherein the elementary signals are orthogonal with respect to one another.

3. The method according to claim 1, wherein the signal pulses of the plurality of signal pulses differ from one another by their modulation.

4. The method according to claim 3, wherein the signal pulses of the plurality of signal pulses have positive chirps and negative chirps.

5. The method according to claim 1, wherein the signal pulses of the plurality of signal pulses have Barker codes or Gold codes.

6. The method according to claim 1, wherein the association of the received ultrasonic signals with the emitted ultrasonic signals has a filtering of the received ultrasonic signals by at least one of correlation filters or transversal filters.

7. The method according to claim 1, wherein the association of the received ultrasonic signals with the emitted ultrasonic signals has an evaluation of the received ultrasonic signals by maximum likelihood sequence estimation.

8. The method according to claim 1, further comprising determining, by an evaluation device comprising at least one processor circuit, a location to an object relative to the ultrasonic sensors based at least partly upon the association of the received ultrasonic signals with the emitted ultrasonic signals, the method being part of an application for maneuvering a machine.

9. The method according to claim 1, wherein the ultrasonic sensors comprise a first ultrasonic sensor that emits the first emitted ultrasonic signals and a second ultrasonic sensor that emits second ultrasonic signals, the first and second emitted ultrasonic signals comprising at least a part of the plurality of emitted ultrasonic signals, the first ultrasonic signal emitted comprises a sequence of the elementary signals that is distinct relative to the sequence of the elementary signals of the second ultrasonic signal emitted, and the association of each received ultrasonic signal with one emitted ultrasonic signal of the plurality of emitted ultrasonic signals is based on the sequence of the pause elementary signal, the first signal pulse elementary signal and the second signal pulse elementary signal forming the received ultrasonic signal.

10. An ultrasonic sensor system for a motor vehicle, comprising:
a plurality of transmitters of a plurality of ultrasonic sensors which are configured to emit respective ultrasonic signals, wherein the ultrasonic signals each comprises a sequence of elementary signals, wherein the elementary signals have signal pauses and a plurality of different signal pulses, and wherein the ultrasonic signals of various transmitting devices of the plurality of transmitting devices differ from one another by the sequence of the elementary signals;
at least one receiver of the ultrasonic sensors which is configured to receive reflected ultrasonic signals; and
at least one evaluation device comprising at least one processor circuit which is configured to associate the received ultrasonic signals with the emitted ultrasonic signals on the basis of the sequences of the elementary signals,
wherein each elementary signal comprises a pause, a first signal pulse or a second signal pulse, the ultrasonic sensors comprise a first ultrasonic sensor that emits first ultrasonic signals and a second ultrasonic sensor that emits second ultrasonic signals, the first and second emitted ultrasonic signals comprising at least a part of the plurality of emitted ultrasonic signals, the first ultrasonic signal emitted comprises a sequence of the elementary signals that is distinct relative to the sequence of the elementary signals of the second ultrasonic signal emitted, and the association of each received ultrasonic signal with one emitted ultrasonic signal of the plurality of emitted ultrasonic signals is based on the sequence of the pause elementary signal, the first signal pulse elementary signal and the second signal pulse elementary signal forming the received ultrasonic signal.

11. The ultrasonic sensor system according to claim 10, wherein the elementary signals are orthogonal with respect to one another.

12. The ultrasonic sensor system according to claim 10, wherein the signal pulses of the plurality of signal pulses differ from one another by their modulation.

13. The ultrasonic sensor system according to claim 12, wherein the signal pulses of the plurality of signal pulses have positive chirps and negative chirps.

14. The ultrasonic sensor system according to claim 10, wherein the signal pulses of the plurality of signal pulses have Barker codes or Gold codes.

15. The ultrasonic sensor system according to claim 10, wherein the at least one evaluation device is configured to associate the received ultrasonic signals with the emitted ultrasonic signals by filtering the received ultrasonic signals with at least one of correlation filters or transversal filters.

16. The ultrasonic sensor system according to claim 10, wherein the at least one evaluation device is configured to associate the received ultrasonic signals with the emitted ultrasonic signals by evaluating the received ultrasonic signals using maximum likelihood sequence estimation.

17. A motor vehicle comprising an ultrasonic sensor system according to claim 10.

18. The ultrasonic sensor system according to claim 10, wherein the at least one evaluation device is further configured to determine a location to an object relative to the ultrasonic sensors based at least partly upon the association of the received ultrasonic signals with the emitted ultrasonic signals, the ultrasonic sensor system being part of an application for maneuvering a motor vehicle.

19. The ultrasonic sensor system according to claim 10, wherein the elementary signals comprise a first signal pulse elementary signal, a second signal pulse elementary signal, and a pause elementary signal in which no signal is emitted, and the at least one processor circuit of the evaluation device associates a first received ultrasonic signal of the received ultrasonic signals with a first emitted ultrasonic signal of the plurality of emitted ultrasonic signals based upon a location of the pause elementary signal in the sequence of the elementary signals forming the first received ultrasonic signal and a location of the pause elementary signal in the sequence of elementary signals forming the first emitted ultrasonic signal.

* * * * *